United States Patent [19]

Deutschenbaur

[11] 4,223,587
[45] Sep. 23, 1980

[54] SELF-DRILLING DOWEL ASSEMBLY WITH AN ANNULAR DRILL BIT

[75] Inventor: Paul Deutschenbaur, Unterpfaffenhofen, Fed. Rep. of Germany

[73] Assignee: Hilti Aktiengesellschaft, Schaan, Liechtenstein

[21] Appl. No.: 12,102

[22] Filed: Feb. 14, 1979

[30] Foreign Application Priority Data

Feb. 27, 1978 [DE] Fed. Rep. of Germany ....... 2808446

[51] Int. Cl.² .......................... E04B 1/49; F16B 13/06
[52] U.S. Cl. ......................................... 85/68; 175/415
[58] Field of Search ...................... 85/68, 72; 175/414, 175/415, 405, 404, 400; 408/204; 405/259

[56] References Cited

U.S. PATENT DOCUMENTS

| | | | |
|---|---|---|---|
| 175,672 | 4/1876 | Crump | 175/400 |
| 2,318,326 | 5/1943 | Padley et al. | 175/400 X |
| 2,545,195 | 3/1951 | Crake | 175/404 X |
| 2,707,897 | 5/1955 | Beeson | 175/415 X |
| 3,213,951 | 10/1965 | Eeles | 175/414 |
| 3,467,209 | 9/1969 | Chromy | 85/68 |
| 4,157,677 | 6/1979 | Deutschenbaur et al. | 85/68 X |

FOREIGN PATENT DOCUMENTS 1885659 1/1964 Fed. Rep. of Germany ............. 85/68

Primary Examiner—Ramon S. Britts
Attorney, Agent, or Firm—Toren, McGeady and Stanger

[57] ABSTRACT

A self-drilling dowel assembly is made up of an expansion sleeve with an annular drill bit formed on one end and a spreader axially displaceable through the sleeve after it has formed a borehole for expanding and anchoring the sleeve in the borehole. The bore through the sleeve is divided by a transverse partition wall into two axially extending blind bores each extending inwardly from an opposite end of the sleeve. The blind bore extending from the drill bit end of the sleeve has a diameter which is 0.5 to 0.9 times the exterior diameter of the sleeve and the axial length of this blind bore is also about 0.5 to 0.9 times the exterior diameter of the sleeve. Axially extending grooves are formed in the exterior surface of the sleeve and recesses extend inwardly from the base of the grooves for facilitating the expansion of the sleeve.

18 Claims, 3 Drawing Figures

SELF-DRILLING DOWEL ASSEMBLY WITH AN ANNULAR DRILL BIT

SUMMARY OF THE INVENTION

The present invention is directed to a self-drilling dowel assembly consisting of an expansion sleeve with a drill bit at one end and a spreader, and, more particularly, the invention is directed to the arrangement of the interior of the expansion sleeve which is divided by a transverse partition wall into two blind bores, one extending inwardly from the drill bit end of the sleeve and the other extending inwardly from the opposite end. The spreader is located within the blind bore extending from the opposite end of the sleeve. The location of the transverse partition wall defines the axial length of each of the blind bores. The exterior surface of the sleeve contains a plurality of circumferentially spaced grooves and recesses extend inwardly from some of these grooves for facilitating the expansion of the sleeve.

Self-drilling dowels are generally used as anchors in concrete or brickwork structures. A characteristic feature of these dowels is that they drill their own holes in the structure by means of a drilling tool which provides both rotational and impact movement for the drill bit located on the leading end of the dowel. After the borehole is formed, the dowel is expanded and anchored within the hole. During the drilling operation, the drilled material removed by the cutting edges of the drill bit should be completely discharged from the borehole.

In conventional self-drilling dowels utilizing an expansion sleeve with a continuous axial bore, the main part of the drilled material is evacuated through the axial bore. Discharging the drilled material through the axial bore, however, has the important disadvantage that the thread, usually provided in the trailing end of the axial bore, is coated with the drilled material and is usable after the anchoring procedure only after a complicated cleaning procedure. Further, a portion of the drilled material is discharged through the annular gap formed between the exterior surface of the sleeve and the surface of the borehole. To improve the discharge of the drilled material through this annular gap, the exterior surface of the expansion sleeve is provided with generally axially extending grooves.

In these known self-drilling dowels, the expansion sleeve must be removed when the borehole is completed to clear both the axial bore in the sleeve and the borehole of any remaining drilled material. Further, a spreader, normally frusto-conically shaped for a portion of its axial length, must be placed into the sleeve for effecting the expanding and anchoring action. The drilled material in the annular gap between the sleeve and the borehole tends to cause jamming of the sleeve so that its removal is usually difficult and time-consuming. After the sleeve is removed, the spreader is inserted into its axial bore and the combination is reinserted into the borehole and the spreader is displaced through the sleeve for effecting the expanding action for anchoring the sleeve or dowel within the borehole.

To avoid this difficult and time-consuming dowel placement procedure and to assure the proper use of the thread within the sleeve, self-drilling dowels have been developed with a transverse partition within the bore in the sleeve adjacent the drill bit end of the dowel so that a blind bore is defined by the drill bit. In this type of self-drilling dowel, the drilled material is discharged exclusively through grooves formed in the exterior surface of the expansion sleeve. The expanding step takes place directly after the borehole has been drilled, by driving a frusto-conically shaped spreader into a correspondingly shaped interior surface of a blind bore extending from the opposite or trailing end of the sleeve. To provide sufficient radial expansion of the sleeve, recesses are formed in the sleeve in the range of the frusto-conical surface of the blind bore extending from the trailing end. As a result, the expansion sleeve ruptures when the spreader is driven into the bore and the ruptured segments of the sleeve are anchored within the borehole.

The drill bit is formed by a number of sector-like cutting edges all arranged in one plane. The inner surface of the portion of the sleeve forming the drill bit defines a blind bore terminating at the transverse partition wall which defines the inner end of the other blind bore extending from the trailing end of the sleeve. The diameter of the blind bore formed by the drill bit end of the sleeve is about one-tenth the exterior diameter of the sleeve and its axial length is about one-quarter of the exterior diameter of the sleeve.

While such dowels have been relatively effective as anchors in structures containing no reinforcing material, significant problems have been experienced when the self-drilling dowel encounters a reinforcing bar in the structure during the drilling operation. The self-drilling dowel which is being rotated and driven axially at the same time, cannot effectively remove the reinforcing bar because the transverse surface of the drill bit represents almost the total transverse surface of the expansion sleeve and provides too great a cutting surface. Further, the difference in velocity between the radially inner and radially outer edges of the drill bit is such that the velocity of the self-drilling dowel adjacent its axial center is insufficient for removing the reinforcing bar. In practice, the reinforcing bar can be removed by the drill bit, if at all, only in part and usually the reinforcing bar is only pressed flat against the inner end of the borehole.

The primary object of the present invention is to provide a self-drilling dowel assembly which can be inserted easily and quickly and which is capable of drilling through reinforcing bars.

In accordance with the present invention, the expansion sleeve of the dowel assembly has an annular drill bit at its leading end forming a bore, circled by the bit, which has a diameter in the range of 0.5 to 0.9 times the exterior diameter of the sleeve. Preferably, the diameter of the bore formed by the drill bit is 0.7 times the exterior diameter of the sleeve.

The bore defined by the annular drill bit has an advantageous cylindrical form. As a result, the drill bit only removes a relatively narrow ring when it encounters a reinforcing bar in drilling a borehole. Because of the position of the drill bit relative to the axis of the sleeve, an effective and uniform cutting velocity is provided so that a chip-removing cutting of the reinforcing bar takes place. The chips cut from the reinforcing bar along with the finely ground drilled material are directed out of the borehole through peripheral grooves formed in the exterior surface of the expansion sleeve. The plug which is cut out of the reinforcing bar corresponds to and is received within the bore defined by the drill bit.

The bore defined by the drill bit is a blind bore with its inner end formed by the same transverse partition wall defining the inner end of the blind bore extending from the opposite end of the sleeve. The axial length of the blind bore extending from the drill bit is about 0.5 to 0.9 times the exterior diameter of the expansion sleeve. Preferably, the axial length of the bore is 0.7 times the exterior diameter of the sleeve. The axial length of this blind bore inwardly of the drilling bit must be within the above range to afford sufficient space to receive the cut-out plug of the reinforcing bar and also to assure the adequate strength of the sleeve in the area of the drill bit to avoid any deformation if the drill bit strikes laterally against a round reinforcing bar. If any deformation of the drill bit end of the sleeve occurred, it would lead to a malfunction of the dowel. The optimum dimensions of the blind bore formed by the drill bit end of the expansion sleeve are afforded when the diameter and axial length of the bore is 0.7 times the exterior diameter of the expansion sleeve.

A very effective anchoring of the dowel is attained, if the sleeve is ruptured outwardly under the expanding effect of the spreader. Accordingly, in the axial range of the frusto-conical portion of the blind bore extending from the trailing end of the expansion anchor, recesses extend inwardly from the grooves formed in the outer surface of the sleeve. The ability of the sleeve to rupture is improved when the recesses extend at least for a portion of their axial length through the sleeve into the blind bore extending from the trailing end of the sleeve. When the drilling operation is carried out, the spreader is positioned within the blind bore so that it covers the openings from the recesses into the interior of the bore and prevents the passage of any drilled material into the bore.

Another feature of the invention involves maintaining the thickness of the transverse partition wall within the bore through the sleeve, in the range of 0.05 to 0.3 times the exterior diameter of the expansion sleeve. With this thickness characteristic of the partition wall, the ability of the sleeve to rupture is maintained within a defined range while the strength of the sleeve needed for the drilling procedure is assured. The thickness range of the partition wall can be a theoretical size resulting, when the surface of the partition wall facing toward the trailing end of the sleeve has a conical shape.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
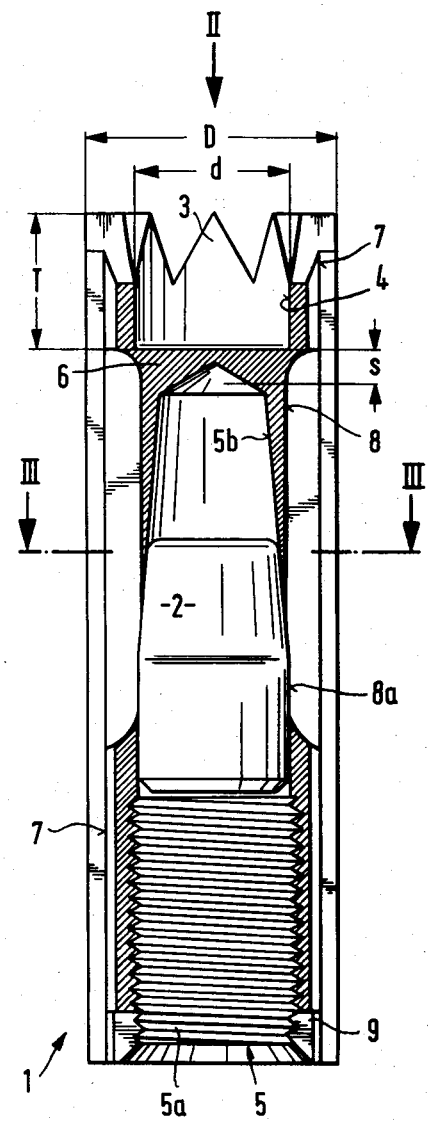
FIG. 1 is an axially extending sectional view of a self-drilling dowel assembly embodying the present invention and taken along the line I—I in FIGS. 2 and 3.

As shown in FIG. 1, the self-drilling dowel assembly embodying the present invention is made up of an axially elongated expansion sleeve 1 and a spreader 2 located within the sleeve. As viewed in FIG. 1, the top end of the sleeve is its leading end when it is used to form a borehole in a structure and its lower end is its trailing end. At its leading end, the expansion sleeve includes an annular, crown-shaped drill bit 3. A bore extends through the sleeve, however, a transverse partition wall 6 extends across the bore and divides it into a first blind bore 4 extending inwardly from the leading or drill bit end of the sleeve to the partition wall 6. A second blind bore 5 extends from the partition wall to the trailing end of the sleeve.

The exterior surface of the sleeve is cylindrically shaped and has a diameter D. The diameter d of the first blind bore 4 is about 0.7 times the exterior diameter D of the expansion sleeve. Further, the axial length of the first blind bore 4 is about 0.7 times the exterior diameter D of the sleeve. These dimensions of the diameter d and the axial length T of the blind bore are the preferred dimensions, however, these dimensions may also be in the range of 0.5 to 0.9 times the exterior diameter D of the sleeve.

Spreader 2 is positioned within the second blind bore 5 in frictional engagement with the surface of the bore. Second blind bore 5 is divided in the axial direction into a cylindrical section extending from the trailing end toward the leading end and a thread 5a is formed in this cylindrical portion. From the end of the cylindrical portion closer to the leading end of the sleeve, the surface of the second blind bore 5 tapers inwardly forming an axially extending frusto-conical portion 5b which extends to the trailing side surface of the partition wall 6. The trailing side surface of the partition wall 6 is conically shaped and the partition wall has an average thickness of about 0.15 times the exterior diameter D of the expansion sleeve 1.

Figure 2:
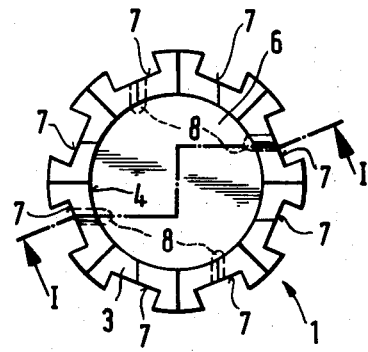
FIG. 2 is a top view of the dowel assembly taken in the direction of the arrow II in FIG. 1.
Figure 3:
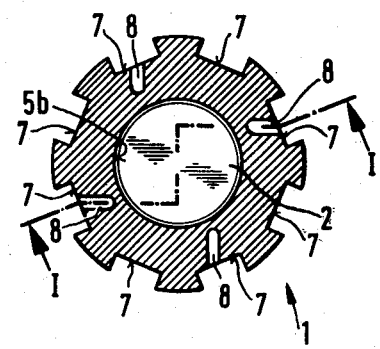
FIG. 3 is a transverse cross-sectional view of the dowel assembly taken along the line III—III in FIG. 1.

Eight axially extending grooves 7, spaced apart in the circumferential direction around the sleeve, extend from the leading end to the trailing end of the sleeve for conveying drilled material out of the borehole. These grooves 7 are uniformly spaced apart around the sleeve and, as shown in FIGS. 2 and 3, have a rectangular cross-section viewed transversely of the axis of the sleeve. In the axially extending region of the frusto-conical portion 5b of the second blind bore 5, four recesses 8 extend inwardly from the base of certain of the grooves 7 toward the inner surface of the second blind bore. As can be seen, these recesses extend rearwardly from the frusto-conical portion 5b into the leading end of the cylindrical portion of the second blind bore 5. Accordingly, the trailing portions of the recesses 8 extend completely through the wall of the sleeve 8 forming break-throughs or openings 8a communicating with the interior of the second blind bore. As indicated in FIG. 1, when the spreader 2 is frictionally engaged within the second blind bore 5, its surface contacts the inner surface of the blind bore and provides a closure or cover for the openings 8a formed by the recesses 8. Accordingly, with the spreader 2 in the position shown in FIG. 1, the dowel assembly can be used for drilling a borehole and the spreader will prevent any drilled material from passing through the openings 8a from the recesses 8 into the interior of the second blind bore 5.

The spreader 2 has a leading frusto-conically shaped surface which is formed complementary to the frusto-conical portion 5b of the second blind bore and it has a cylindrically shaped surface extending rearwardly from the frusto-conically shaped surface and this cylindrically shaped surface is complementary to the cylindrically shaped portion of the second blind bore, accordingly, the spreader can be inserted into the second blind bore from the trailing end until it is frictionally engaged with the frusto-conical portion 5b in the bore.

At its trailing end, the sleeve 1 has a slot 9 into which an adapter, not shown, of a drilling tool can be inserted for rotating the sleeve.

While specific embodiments of the invention have been shown and described in detail to illustrate the application of the inventive principles, it will be understood that the invention may be embodied otherwise without departing from such principles.

What is claimed is:

1. Self-drilling dowel assembly comprising an axially elongated expansion sleeve forming an axially extending bore therethrough and having a first end and a second end, a drill bit formed on the first end of said expansion sleeve, a partition wall located within the bore in said expansion sleeve and extending transversely across and dividing the bore into a first blind bore extending from the first end of said sleeve to said partition wall and a second blind bore extending from the second end of said sleeve to said partition wall, a spreader positioned within the second blind bore in said sleeve and said spreader being axially displaceable within the bore in the direction from the second end toward the first end in frictional contact with the surface of the second bore for expanding said sleeve outwardly, wherein the improvement comprises that the first blind bore in said expansion sleeve has a diameter in the range of 0.5 to 0.9 times the exterior diameter of said expansion sleeve at the first end thereof.

2. Self-drilling dowel assembly, as set forth in claim 1, wherein the first blind bore in said expansion sleeve has a diameter that is 0.7 times the exterior diameter of said expansion sleeve at the first end thereof.

3. Self-drilling dowel assembly, as set forth in claim 1, wherein the axial depth of said first blind bore from the first end of said expansion sleeve to said partition wall is in the range of 0.5 to 0.9 times the exterior diameter of said expansion sleeve at the first end thereof.

4. Self-drilling dowel assembly, as set forth in claim 3, wherein the axial depth of said first bore from the first end of said expansion sleeve to said partition wall is 0.7 times the exterior diameter of said expansion sleeve at the first end thereof.

5. Self-drilling dowel assembly, as set forth in claim 1, wherein said partition wall is shaped to rupture when said spreader is axially displaced through said second blind bore toward the first end of said expansion sleeve.

6. Self-drilling dowel assembly, as set forth in claim 5, wherein said partition wall has a thickness in the axial direction of said expansion sleeve in the range of 0.05 to 0.3 times the exterior diameter of said expansion sleeve at the first end thereof.

7. Self-drilling dowel assembly, as set forth in claim 5, wherein said partition wall has an average thickness in the axial direction of said expansion sleeve of 0.15 times the exterior diameter of said expansion sleeve at the first end thereof.

8. Self-drilling dowel assembly, as set forth in claim 5, wherein said partition wall has a first transverse surface forming the inner end of said first blind bore and a second transverse surface forming the inner end of said second blind bore, said first transverse surface is flat and extends substantially perpendicularly of the axis of said bore and the second surface is conically shaped with the radially outer part of the partition wall having a greater thickness than the portion of said partition wall located on the axis of said expansion sleeve.

9. Self-drilling dowel assembly, as set forth in claim 1, wherein the exterior surface of said expansion sleeve is cylindrically shaped and has a plurality of axially extending grooves spaced apart in the circumferential direction of said sleeve.

10. Self-drilling dowel assembly, as set forth in claim 9, wherein said grooves have a rectangular shape in the transverse section of said expansion sleeve.

11. Self-drilling dowel assembly, as set forth in claim 10, wherein at least some of said grooves have recesses formed in the base of said grooves extending inwardly toward the surface of said second blind bore.

12. Self-drilling dowel assembly, as set forth in claim 11, wherein said recesses extend from a transverse plane in the axial range of said partition wall toward said second end of said expansion sleeve.

13. Self-drilling dowel assembly, as set forth in claim 12, wherein the interior surface of said second blind bore is frusto-conically shaped for at least a portion of the axial length thereof from said partition wall with the frusto-conical surface converging in the direction toward the first end of said sleeve, and said spreader having a frusto-conically shaped axially extending outer surface complementary to the frusto-conical surface within said second blind bore.

14. Self-drilling dowel assembly, as set forth in claim 13, wherein the portion of said expansion sleeve forming said second blind bore includes said frusto-conically shaped inner surface and a cylindrically shaped inner surface extending axially from said frusto-conically shaped inner surface toward the second end of said sleeve and said recesses extending from the range of said frusto-conically shaped surface toward said second end of said sleeve for at least an axially extending portion of said cylindrically shaped inner surface, and said recesses being open into said second blind bore in the axial range of said recesses corresponding to the axial range of said cylindrically shaped inner surface.

15. Self-drilling dowel assembly, as set forth in claim 14, wherein said spreader having an axially extending cylindrically shaped section extending from said frusto-conically shaped section in the direction toward the second end of said sleeve and the cylindrically shaped section of said spreader having a diameter corresponding to the diameter of said cylindrically shaped inner surface of said second blind bore so that said spreader is slidably displaceable through said cylindrically shaped inner surface portion of said sleeve and the axial length of the cylindrically shaped section is such that the cylindrically shaped section covers the openings through said sleeve formed by said recesses.

16. Self-drilling dowel assembly, as set forth in claim 15, wherein said recesses extend chordally of the transverse cross-section of said expansion sleeve.

17. Self-drilling dowel assembly, as set forth in claim 1, wherein said drill bit having a plurality of teeth extending in an annular arrangement around the first end of said sleeve, said teeth extending from the exterior surface to the interior surface of said sleeve, and the axial length of said teeth being less than the axial length of said first blind bore from the first end to said partition wall.

18. Self-drilling dowel assembly, as set forth in claim 13, wherein said frusto-conically shaped surface extends from said partition wall toward the second end of said sleeve.

* * * * *